United States Patent [19]
Miyazaki

[11] Patent Number: 5,420,707
[45] Date of Patent: May 30, 1995

[54] PLASMA ADDRESSING ELECTRO-OPTICAL DEVICE WITH WALL SURFACE PLASMA ELECTRODES

[75] Inventor: Shigeki Miyazaki, Kanagawa, Japan

[73] Assignee: Sony Corporation, Tokyo, Japan

[21] Appl. No.: 50,810

[22] Filed: Apr. 21, 1993

[30] Foreign Application Priority Data

Apr. 21, 1992 [JP] Japan .................. 4-128261

[51] Int. Cl.$^6$ .................. G02F 1/133; G09G 3/36
[52] U.S. Cl. .................. 359/54; 359/87; 313/582; 345/60; 345/87; 315/169.4
[58] Field of Search .................. 359/54, 55, 74, 79, 359/87; 345/60, 87, 74; 315/169.1, 169.4; 313/517, 582, 584, 586, 587

[56] References Cited

U.S. PATENT DOCUMENTS

| | | | |
|---|---|---|---|
| 3,873,870 | 3/1975 | Fukushima et al. | 313/217 |
| 4,896,149 | 1/1990 | Buzak et al. | 345/60 |
| 5,077,553 | 12/1991 | Buzak | 345/60 |
| 5,214,521 | 5/1993 | Kwon et al. | 359/54 |
| 5,221,979 | 6/1993 | Kim | 359/54 |
| 5,272,472 | 12/1993 | Buzak | 345/60 |
| 5,276,384 | 1/1994 | Martin | 313/582 |

OTHER PUBLICATIONS

Patent Abstracts of Japan JP63-232243-Jan. 1989.

*Primary Examiner*—William L. Sikes
*Assistant Examiner*—Tai V. Duong
*Attorney, Agent, or Firm*—Hill, Steadman & Simpson

[57] ABSTRACT

A plasma addressing electro-optical device having an improved surface electrode structure which miminizes the structure of a plasma cell and is capable of producing stabilized plasma discharge. The plasma addressing electro-optical device includes a first substrate having a plurality of first electrodes which are arranged substantially in parallel to each other on a major surface, and a second substrate which is opposed to the first substrate and has a plurality of second electrodes which are arranged substantially in parallel to each other on a major surface thereof so as to define an addressing unit for plasma discharge between the inside wall surfaces of adjacent ones of the second electrodes. The second electrode each function as an anodes and a cathode and preferably have a height of 100 μm or more. An electro-optical material layer is positioned between the first and second substrates and ionizable gas is contained in a discharge chamber formed between the electro-optical material layer and the second substrate.

8 Claims, 5 Drawing Sheets

PLASMA ADDRESSING ELECTRO-OPTICAL DEVICE WITH WALL SURFACE PLASMA ELECTRODES

CROSS-REFERENCES TO CO-PENDING APPLICATIONS

The two listed co-pending applications are assigned to Sony Corporation, the assignee of the present application. The two co-pending applications are U.S. Ser. No. 837,962, filed Feb. 20, 1992, entitled "ELECTRO-OPTICAL DEVICE", in which the inventor is Masatake Hayashi, and U.S. Ser. No. 837,961, filed Feb. 20, 1992, entitled "ELECTRO-OPTICAL DEVICE", in which the inventor is Shigeki Miyazaki.

BACKGROUND OF THE INVENTION

1. Field of the Invention

This invention relates to a plasma addressing electro-optical device having a two-layer structure including two layers of an electro-optical cell such as a liquid crystal cell and a plasma cell, and more particularly to the structure of a discharge electrode provided in a plasma cell in a plasma addressing electro-optical device of the type mentioned.

2. Description of the Related Art

An electro-optical device of the matrix type which employs a liquid crystal cell as an electro-optical cell such as, for example, a liquid crystal display device, conventionally employs, as a commonly known means for assuring a high resolution and a high contrast, an active matrix addressing system wherein a switching element such as a thin film transistor is provided for each picture element and the switching elements are driven in a line sequential condition. However, according to the active matrix addressing system, it is necessary to provide a large number of semiconductor elements such as thin film transistors on a substrate. Accordingly, the active matrix addressing system is disadvantageous in that, when the substrate has a large area, the yield in production is low.

A solution to the disadvantage has been proposed by Buzak et al. and is disclosed in Japanese Patent Laid-Open Application No. Heisei 1-217396 (corresponding to U.S. Pat. No. 4,896,149 and No. 5,077,553) wherein a plasma switch is employed in place of a switching element formed from a thin film transistor or a like element. The, general construction of a plasma addressing display device wherein a liquid crystal cell is driven making use of switches based on plasma discharge will be briefly described. Referring to FIG. 3, the plasma addressing display device is shown which has a layered flat panel structure which includes a liquid crystal cell 101, a plasma cell 102 and a common intermediate sheet 103 interposed between the liquid crystal cell 101 and the plasma cell 102. The plasma cell 102 is formed by using a glass substrate 104 and has a plurality of parallel channels 105 formed on a surface thereof. The channels 105 extend, for example, in a direction along the rows of the matrix. The channels 105 are individually closed by the intermediate sheet 103 so as to define plasma chambers 106 which are individually separated from each other. Ionizable gas is enclosed in each of the plasma chambers 106. An extending portion 107 of the glass substrate 104 is disposed between each adjacent ones of the channels 105 and serves as a barrier rib for isolating the adjacent plasma chambers 106 from each other and also as a gap spacer for the plasma chambers 106. A pair of parallel plasma electrodes are provided on a curved bottom surface of each of the channels 105 and function as an anode A and as cathode K so as to ionize the gas in the plasma chamber 106 to produce discharge plasma. Such discharge area forms a row scanning unit.

The the liquid crystal cell 101 is constructed using a transparent substrate 108. The substrate 108 is disposed in an opposing relationship to the intermediate sheet 103 with a predetermined gap left therebetween, and a liquid crystal layer 109 fills the gap. Signal electrodes 110 made of a transparent conducting material are formed on an inner surface of the substrate 108. The signal electrodes 110 extend perpendicularly to the plasma chambers 106 and form column driving units. Picture elements in a matrix are defined at intersecting positions between the column driving units and the row scanning units.

In the display device having such a construction as described above, the plasma chambers 106 in which plasma discharge occur are switched so as to be scanned in a line sequential condition when an analog driving voltage is applied to the signal electrodes 110 of the liquid crystal cell side in synchronism with such scanning signal so as to effect driving of the display apparatus. If plasma discharge occurs in a plasma chamber 106, the potential of the inside of the plasma chamber 106 becomes substantially uniform to that of the anode A so that picture element selection of each row is performed. In other words, each of the plasma chamber 106 functions as a sampling switch. If a driving voltage is applied to each picture element while the plasma sampling switch is in an on state, then sample hold is performed so that the lighting or extinction of the picture element can be controlled. Also after the plasma sampling switch is placed into an off condition, the analog driving voltage is held to a value of the picture element.

In the structure shown in FIG. 3, the plasma electrodes are formed on the curved bottom surfaces of the channels 105 such that an anode A and a cathode K in each pair are disposed in an opposing relationship in an inclined condition. Such arrangement is hereinafter referred to as inclined surface electrode structure. In this structure, the path of plasma discharge is formed between the electrode surface of the anode A to the electrode surface of the opposing cathode K, and accordingly, stable and efficient plasma discharge can be obtained.

However, in order to realize such inclined surface electrode structure as described above, it is necessary to form a stripe-like groove 105 on the surface of the substrate 104, but this involves considerable difficulty in production, and particularly it is very difficult to provide a stripe pattern with a high density. Also, it is complicated and difficult to actually form plasma electrodes in individual channels with an etching process.

So as to solve such problems of the conventional plasma addressing electro-optical devices to be solved into consideration, the applicant of the present invention has proposed, in Japanese Patent Application No. Heisei 3-47784 previously filed, a plasma addressing electro-optical device which is simple in structure and is suitable to be used to produce a screen having a large size and/or a high resolution. The structure of the proposed device will be described subsequently with reference to FIG. 4 to facilitate understanding of the present invention. Also the proposed device has a flat panel structure wherein a liquid crystal cell 201 and a plasma cell 202 are layered with an intermediate sheet 203 interposed therebetween. The liquid crystal cell 201 has basically the same structure as the liquid crystal cell 101 shown in FIG. 1. Ionizable gas is enclosed in a plasma chamber 205 defined between the intermediate sheet 203 and a lower substrate 204. A plurality of stripe-like plasma electrodes 206 are formed in a predetermined spaced relationship from each other on an inner surface of the substrate 204. Since the plasma electrodes 206 can be formed on a flat substrate by screen printing or a like technique, the production rate is high and the plasma electrodes 206 can be finely accurately formed. A barrier rib 207 is formed on each of the plasma electrodes 206, and the barrier ribs 207 divide the plasma chamber 205 into several discharge regions which form row scanning units. Also the barrier ribs 207 can be formed by screen printing or a like technique.

The plasma electrodes 206 are formed on the plane of the substrate 204, and since the discharge surfaces of the plasma electrodes 206 are positioned at the same level, they are not opposed to each other which is, different from those in the inclined surface electrode structure described hereinabove. The electrode arrangement shown in FIG. 4 will be hereinafter referred to as a flat surface electrode structure. Apparently the flat surface electrode structure has several significant advantages during manufacture as compared with the inclined surface electrode structure. Further, all of the barrier ribs 207 are formed on the plasma electrodes 206, and the anodes A and the cathodes K have the same construction. Accordingly, when the device shown in FIG. 4 is driven, the plasma electrodes 206 alternately change over in function between anodes A and cathodes K. Consequently, the plasma electrodes 206 are used as both as of the anodes and as the cathodes, and accordingly in, there is an advantage that the number of effective scanning lines can be doubled as compared with that of the structure shown in FIG. 3.

However, the flat surface electrode structure described above has several problems which are to be solved. First, in order to produce stable plasma discharge, the space or distance of the plasma cell 202, that is, the height of the plasma chamber 205, must necessarily be set to be equal to or larger than about 75% of the distance between the anode/cathode electrodes, which is a restriction on the structure of the cell. In particular, according to the flat surface electrode structure, the electrode surfaces of the anodes/cathodes are not opposed to each other, and paths of plasma discharge form substantially parabolic curves. If the height of the plasma chamber 205 is small, the discharge paths are intercepted by the intermediate sheet 203 constituting the ceiling of the plasma chamber 205, and consequently, stable plasma discharge cannot be maintained. As the distance between the anodes and the cathodes increases, the height of the plasma chamber must be increased, making it difficult to manufacture.

The second problem is the displacement in pitch between the plasma electrodes 206 and the barrier ribs 207. Both both members are formed by screen printing or a like technique, and as the stripe pattern becomes finer, the error in alignment become more significant so that the barrier ribs 207 may be placed out of register with the plasma electrodes 206. Consequently, the areas of the exposed surfaces of the plasma electrodes 206 on the opposite sides of each barrier rib 207 become different from each other. On the side on which the exposed surface area decreases, only a side end portion of the electrode contributes to plasma discharge, and as a result of concentration of the electric field, a breakdown is liable to occur which causes a failure in discharge.

The third problem is that plasma discharge becomes unstable form a barrier rib positioned on an anode. It is believed that the reason for this that the barrier rib is made of a dielectric material which acts to prevent electrons from flowing from a cathode to an anode. FIG. 5 shows simulated electron trajectories in a plasma cell. Referring to FIG. 5, each solid line indicates a trajectory in a complete vacuum and each broken line indicates an estimated electric line of force. The former corresponds to a case wherein the velocity component of the electron is at the maximum while the other corresponds to another case where the velocity component is lost completely due to collision with plasma and, accordingly, is equal to zero. Actually, electrons will travel intermediate trajectories between those indicated. Since the velocity component is not reduced to zero, an electron emitted by a cathode considerably overruns an anode. However, when stable plasma discharge is maintained, electron trajectories take discharge paths on the inner sides of the electrodes. Accordingly, it is believed that, above an anode, an electron flies to a position which is considerably inwardly from the end of the electrode. Consequently, if a barrier rib 207 of a dielectric material is present at a central portion of an anode electrode makes the exposed surface area of the electrode extremely small, then electrons are prevented from flowing into the electrode.

SUMMARY OF THE INVENTION

It is an object of the present invention to provide a plasma addressing electro-optical device having an improved surface electrode structure which is easy to manufacture and is capable of producing stabilized plasma discharge.

In order to attain the object described above, according to an aspect of the present invention, there is provided a plasma addressing electro-optical device, which comprises a first substrate having a plurality of first electrodes arranged substantially in parallel to each other on a major surface thereof, a second substrate opposed to the first substrate and having a plurality of second electrodes arranged substantially in parallel to each other on a major surface thereof so as to thereby define an addressing unit for plasma discharge between the inside wall surfaces of adjacent ones of the second electrodes. An electro-optical material layer is positioned between the first and second substrates, and ionizable gas contained in a discharge chamber is formed between the electro-optical material layer and the second substrate.

Preferably, the second electrode has a height of 100 $\mu m$ or more.

The plasma addressing electro-optical device may further comprise a dielectric material layer disposed between the electro-optical material layer and the discharge chamber so as to isolate the electro-optical material layer from the ionizable gas. The second electrodes may have top surfaces which support the dielectric material layer thereon. The plasma addressing electro-optical device may further comprise a barrier layer disposed between the dielectric material layer and the top surfaces of the second electrodes.

Each of the second electrodes may function as an anode or a cathode.

In the plasma addressing electro-optical device, plasma discharge paths are formed between the wall surface of the anode and the wall surface of the cathode which are opposed to each other. Such electrode construction will be hereinafter referred to as wall surface electrode structure. Accordingly, the discharge paths extend substantially linearly in a uniform electric field, and consequently, very stable plasma discharge is obtained. An obstacle such as a barrier rib does not exist between the opposed wall surfaces of the second electrodes. In the wall surface electrode structure, the plasma electrodes themselves function as barrier ribs. When the plasma electrodes are driven as both anodes and cathodes, the number of effective scanning lines can be doubled as compared with the inclined surface electrode structure. When the wall surface electrode structure is to be formed, the plasma electrodes may have a large thickness. For example, a layering screen printing technique can be used, and a manufacturing process which is basically the same for the plane surface electrode structure can be used.

Thus, with the plasma addressing electro-optical device, since the wall surface electrode structure is employed wherein the second electrodes are provided with a comparatively large thickness so that discharge paths are formed between the wall surfaces of the opposing second electrodes, no restriction in structure upon designing of a plasma cell occurs with conventional plasma addressing electro-optical device described hereinabove. This increases increase the degree of freedom in designing and stable and uniform discharge can be obtained. In the wall surface electrode structure, since the anodes and the cathodes are opposed to each other as in the conventional inclined surface electrode structure, in addition to the advantage that stabilized plasma discharge can be obtained, channels in a substrate need not be formed which is, different from the inclined surface electrode structure, and accordingly, the plasma addressing electro-optical device can be produced advantageously. Also in the flat surface electrode structure previously developed, discharge paths have parabolic curve trajectories, and in the wall surface electrode structure of the present invention, discharge paths extend linearly and there is no restriction on the structure of the cell. Furthermore, since the second electrodes themselves function as barrier ribs, the errors in alignment between dielectric barrier ribs and electrodes, which is a problem of the flat surface electrode structure, are eliminated.

According to another aspect of the present invention, there is provided an addressing structure, which comprises a substrate having a plurality of electrodes on a major surface thereof such that the plasma discharge occurs between the side wall surfaces of adjacent ones of the electrodes, a dielectric material layer opposed to the substrate, and ionizable gas filled between the substrate and the dielectric material layer.

The electrodes may have upper ends which support the dielectric material layer thereon.

Preferably, the electrodes have a height of 100 μm or more.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
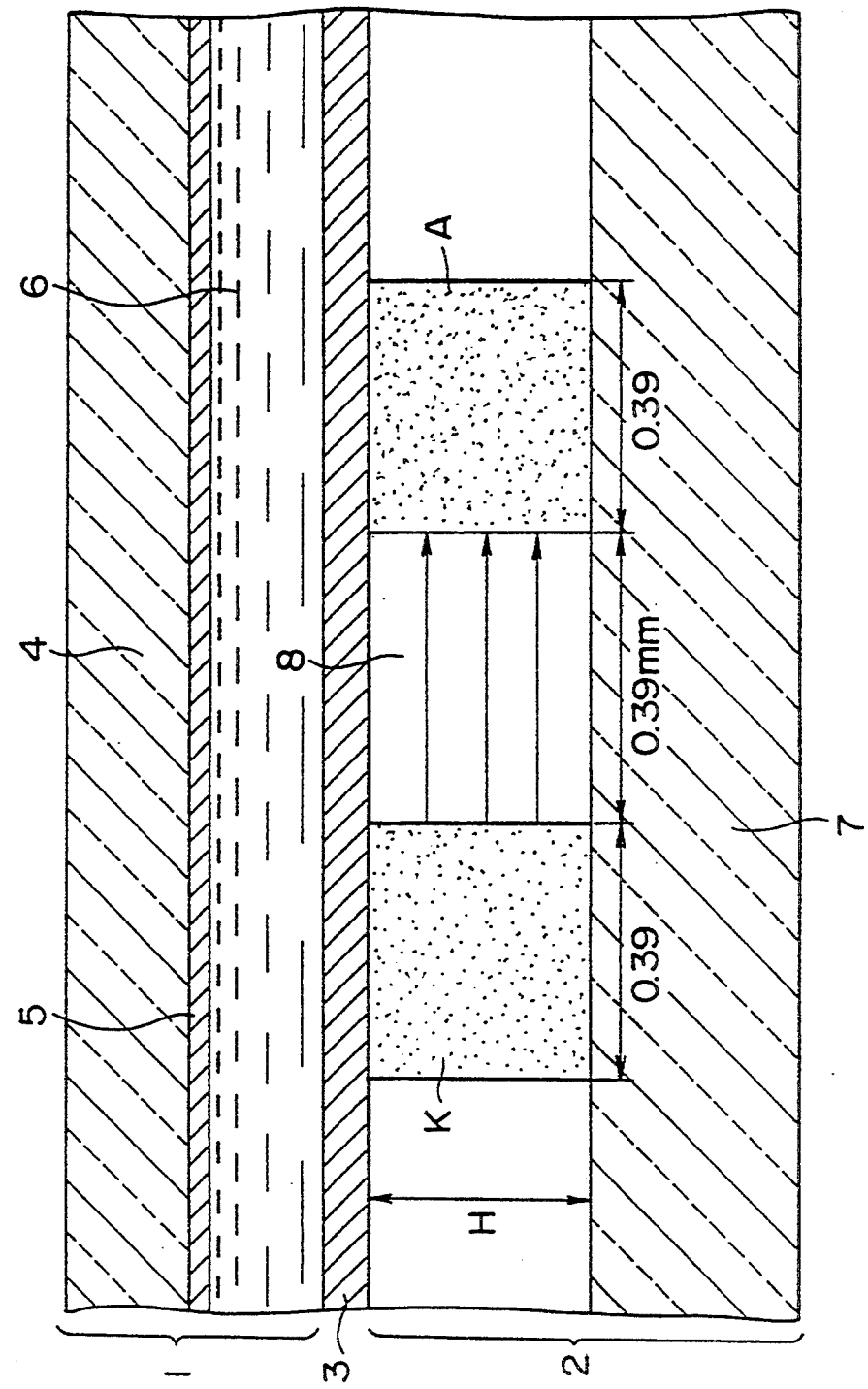
FIG. 1 is a schematic partial sectional view showing a plasma addressing electro-optical device of the wall surface electrode structure according to the present invention.

Referring to FIG. 1, there is shown a basic structure of a plasma addressing electro-optical device according to the present invention. The plasma addressing electro-optical device is shown in section taken in a direction along a row, that is, along a signal electrode therein. The plasma addressing electro-optical device has a flat panel structure wherein a liquid crystal cell 1, a plasma cell 2 and a common intermediate sheet 3 made of a dielectric material are layered with the intermediate sheet 3 interposed between the liquid crystal cell 1 and the plasma cell 2. The liquid crystal cell 1 is constructed using a glass substrate 4, and a plurality of signal electrodes 5 formed from a transparent conductive film are formed in parallel to each other on an inner major surface of the glass substrate 4. The substrate 4 is disposed in an opposing relationship to the intermediate sheet 3 with a predetermined gap left therebetween, and a liquid crystal layer 6 as an electro-optical material layer is filled in the gap. In the present embodiment, an electro-optical material in the form of fluid is employed, but the electro-optical material is not limited to such a specific material. For example, an electro-optical crystal plate may be employed. In this instance, it is possible to eliminate the intermediate sheet 3. Further, while the present embodiment relates to a plasma addressing display device, the present invention is not limited to such plasma addressing display device but can be applied widely to various plasma addressing electro-optical devices such as an optical modulating device.

Figure 4:
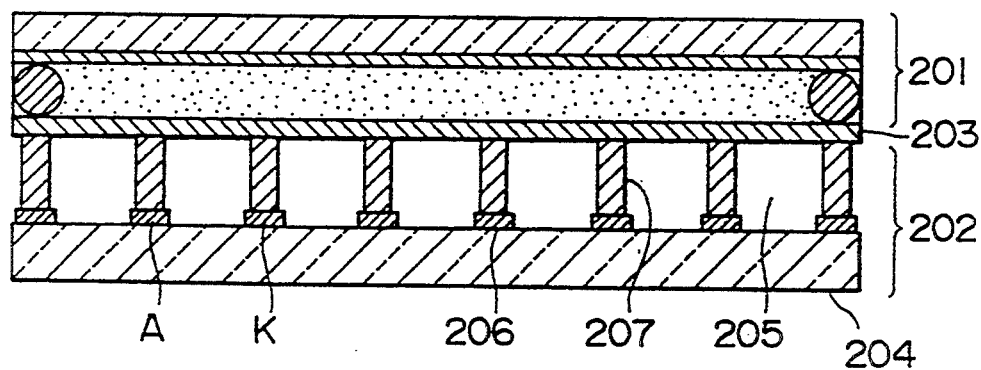
FIG. 4 is a schematic sectional view showing a plasma addressing electro-optical device of the flat surface electrode structure which was previously developed.
Figure 5:
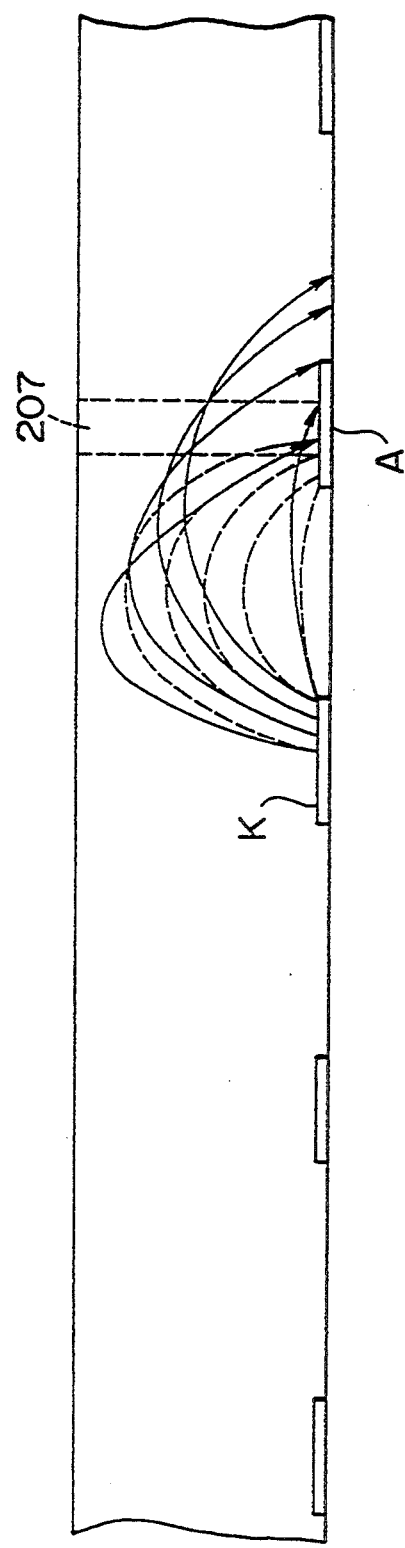
FIG. 5 is a diagrammatic view showing loci of electrons in the plasma addressing electro-optical device of the flat surface electrode structure.
Figure 6:
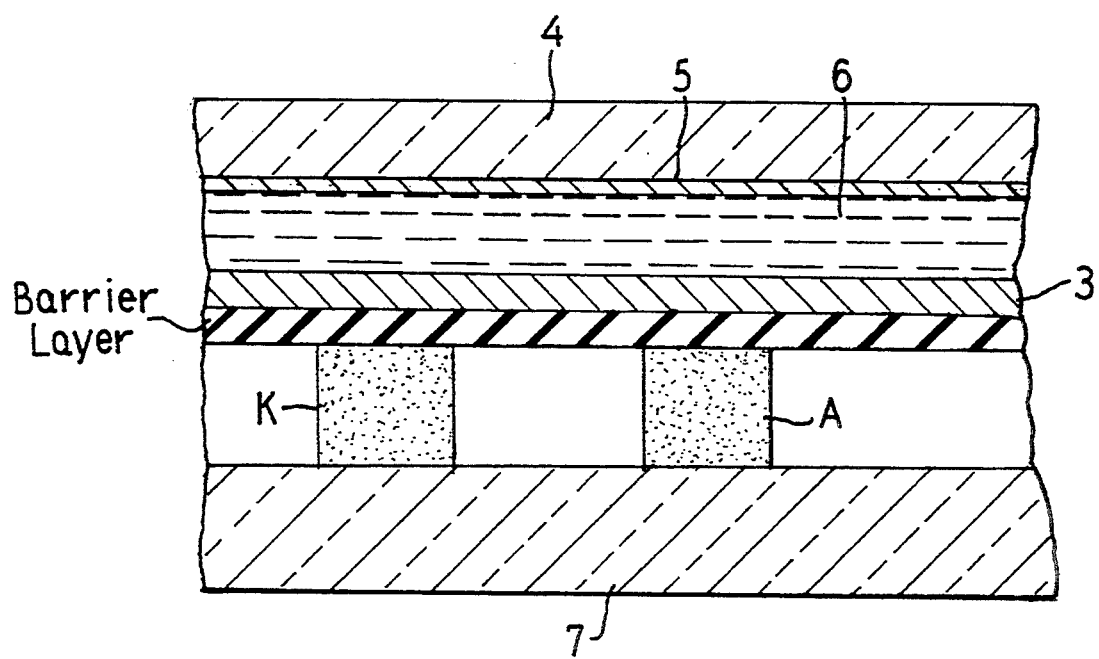
FIG. 6 illustrates the barrier layer.

The plasma cell 2 is constructed using a lower glass substrate 7. A plurality of plasma electrodes are formed in a predetermined spaced relationship from each other in a stripe pattern on an inner major surface of the substrate 7 and extend perpendicularly to the signal electrodes 5. The plasma electrodes alternatively exhibit functions of cathodes K and anodes A. The width of the plasma electrodes is set to 0.39 mm while the distance between the electrodes is set also to 0.39 mm. As seen from FIG. 1, the plasma electrodes have a predetermined thickness and are interposed between the intermediate sheet 3 and the glass substrate 7 so that they also function as barrier ribs. The barrier rib height H of the plasma electrodes is set equal to or greater than 100 μm (0.1 mm). The plasma electrodes can be formed, for example, by successive thick film screen printing. Generally, the film thickness of electrodes formed by a single operation of thick film printing and baking is 15 μm or so. There is no necessity of adjusting electrodes and barrier ribs into alignment with each other as with the structure shown in FIG. 4. In particular, the barrier rib electrodes can be formed with a very high degree of accuracy by successively printing using the same screen mask. It is to be noted that, while the plasma electrodes in the present embodiment are produced by printing in layers, the present invention is not limited to this. Basically, any means by which barrier rib electrodes can be formed in a plasma cell may be adopted. It is possible to adopt, for example, a combination of full area printing and powder beam etching. Further, in the present embodiment, the tops of the plasma electrodes contact directly the intermediate sheet 3. However, a dielectric barrier rib layer may be provided between the tops of the plasma electrodes and the intermediate sheet 3. The arrangement is advantageous in that crosstalk between the plasma electrodes and the signal electrodes 2 on the liquid crystal cell 1 side can be avoided.

The glass substrate 7 is sealed to the intermediate sheet 3 with a predetermined gap left therebetween such that a plasma chamber 8 which is sealed so as to be airtight is defined between them. The plasma chamber 8 is divided by the plasma electrodes, which have a function of barrier ribs, into discharge regions which individually make row scanning units. Ionizable gas is enclosed in the inside of the airtight plasma chamber 8. The gas may be selected from, for example, helium, neon, argon or any mixture of such gases. As seen from FIG. 1, a wall surface of a cathode K and a wall surface of an anode A are disposed in an opposing relationship to each other in the plasma chamber 8, and accordingly, the electrodes have such a wall surface electrode structure such as described hereinabove. The wall surface electrode structure is equivalent to the parallel flat plate surface electrode structure, and discharge paths as indicated by arrows extend straight from one to the other of the opposed electrode wall surfaces. Since there are no obstacles between the two wall surface electrodes, extremely stabilized plasma discharge or glow discharge can be obtained.

In order to determine an optimum range for the thickness of the plasma electrodes, plasma cell samples having different thicknesses ranging from 20 μm to 130 μm were produced, and the plasma discharge conditions were observed. The samples were flat cells having a diagonal dimension of 5.5 inches, and the plasma electrode pitch was set to 0.78 mm and the plasma electrode width was set to 0.39 mm. The result of the observation is indicated in Table 1 below.

TABLE 1

| Electrode Thickness(μm) | Discharge |
| --- | --- |
| 20 | X |
| 38 | X |
| 52 | X |
| 68 | X |
| 72 | X |
| 88 | X |
| 90 | Δ |
| 106 | O |
| 130 | O |

O: good, Δ: allowable, X: no good

When the electrode thickness is comparatively small, a breakdown is caused by the concentration of an electric field at the ends of the electrodes, and regular discharge does not occur. However, when the electrode thickness is rather great, stabilized discharge is obtained. For stabilized discharge, the electrode thickness is required to be equal to or greater than about 100 μm. This dimension correspond to 26% of the 0.39 mm of the distance between the electrodes, and has a significant difference from the value of 75% which delineates the minimum height of the plasma chamber in the flat surface electrode structure. It is to be noted that the pressure of gas necessary for stabilized discharge was 45 Torr and the discharge starting voltage was 390 V. Comparing with the flat surface electrode structure, a gas pressure which is twice that or so is required, and also the discharge starting voltage is higher by several tens of volts. While discharge paths in the flat surface electrode structure follow parabolic curves, the discharge paths in the wall surface electrode structure are straight and are shorter that the flat surface electrode structure. Accordingly, a higher gas pressure is required based on the Paschen's law. As regards the discharge starting voltage, it is believed that it is influenced by various factors such as the surface condition of the wall surface electrodes so that it is raised a small amount.

Figure 2:
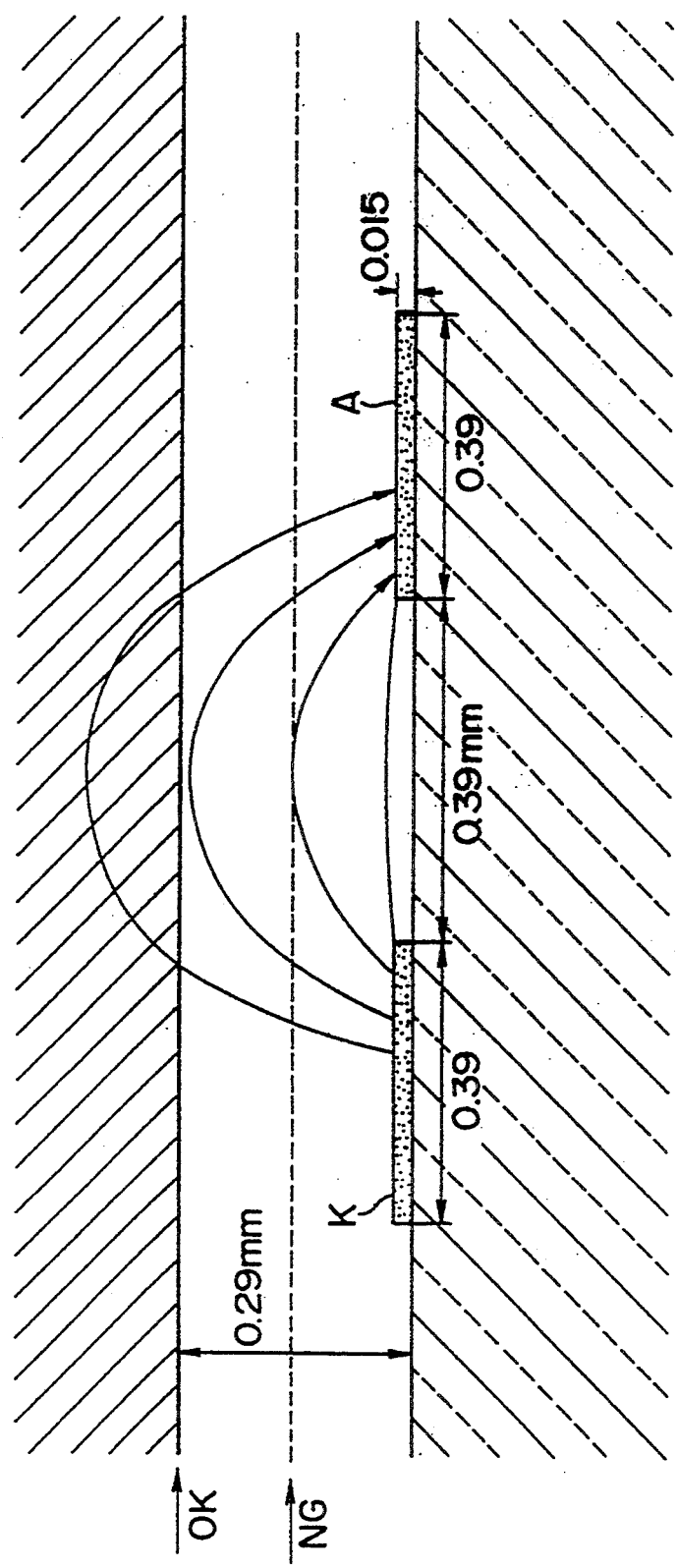
FIG. 2 is a schematic diagrammatic view showing discharge paths in a plasma addressing electro-optical device of the flat surface electrode structure which as previously developed.
Figure 3:
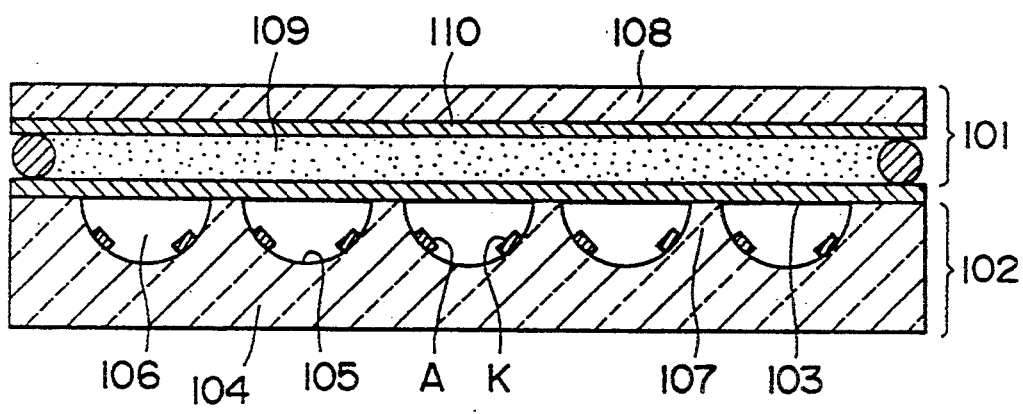
FIG. 3 is a schematic sectional view showing a conventional plasma addressing electro-optical device of the inclined surface electrode structure.

Discharge paths routes in a plasma addressing electro-optical device of the flat surface electrode structure are shown in FIG. 2 for comparison. The width of and the distance between the plasma electrodes are set so as to be similar to those in the embodiment shown in FIG. 1. The thickness of the flat plasma electrodes is 15 μm (0.015 mm). As seen from FIG. 2, the discharge paths follow parabolic curves from a cathode K to an anode A. In order to prevent interception of the parabolic curve paths, it is necessary to set the height of the plasma chamber equal to or greater than about 75% of the distance of 39 mm between the electrodes, that is, equal to or greater than 0.29 mm. Consequently, when the ceiling of the plasma chamber is low, for example, at a level indicated by a broken line, it is difficult to maintain stabilized plasma discharge. In contrast, in the wall surface electrode structure according to the present invention, stabilized plasma discharge can be obtained if the height of the electrode wall surfaces is set at least to 0.10 mm in order to prevent a breakdown.

Having now fully described the invention, it will be apparent to one of ordinary skill in the art that many changes and modifications can be made thereto without departing from the spirit and scope of the invention as set forth herein.

What is claimed is:

1. A plasma addressed electro-optical device, comprising:

a first substrate having a plurality of first electrodes extend in a first direction and arranged substantially in parallel to each other on a major surface thereof;

a second substrate opposed to said first substrate and having a plurality of second electrodes arranged substantially in parallel to each other on a major surface thereof, and which extend in a second direction which is perpendicular to said first direction, each of the second electrodes having a thickness of 100 μm or more, and being disposed on the second substrate in such a manner that side surfaces of adjacent second electrodes face one another;

an electro-optical material layer positioned between said first and second substrates; and ionizable gas contained in discharge chambers formed between said electro-optical material layer and said second substrate, the discharge chambers having heights substantially equal to said thickness of the second electrodes.

2. A plasma addressing electro-optical device as claimed in claim 1, further comprising a dielectric material layer disposed between said electro-optical material layer and said discharge chamber to isolate said electro-optical material layer from said ionizable gas.

3. A plasma addressing electro-optical device as claimed in claim 2, wherein said second electrodes have top surfaces which support said dielectric material layer thereon.

4. A plasma addressing electro-optical device as claimed in claim 2, further comprising a barrier layer disposed between said dielectric material layer and said top surfaces of said second electrodes.

5. A plasma addressing electro-optical device as claimed in claim 1, wherein each of said second electrodes functions as an anode and a cathode.

6. A plasma addressing electro-optical device as claimed in claim 1, wherein said second electrodes are directly formed on the second substrate.

7. A plasma addressing electro-optical device as claimed in claim 1, wherein said second electrodes are formed by a printing procedure.

8. An addressing structure, comprising:
a substrate having a plurality of parallel arranged electrodes on a major, surface thereof, each of said electrodes having a thickness of 100 $\mu$m or more, and being disposed on the major surface of the substrate in such a manner that side surfaces of adjacent electrodes face one another;
a planar dielectric material layer mounted on said plurality of electrodes; and
ionizable gas filled between said substrate and said dielectric material layer to form discharge chambers which have heights substantially equal to said thickness of said electrodes.

* * * * *